United States Patent [19]

Fischer et al.

[11] Patent Number: 5,717,033
[45] Date of Patent: Feb. 10, 1998

[54] DULL, TRANSPARENT THERMOPLASTIC RESINS

[75] Inventors: Wolfgang Fischer, Ludwigshafen; Norbert Güntherberg, Speyer; Graham Edmund McKee, Weinheim, all of Germany

[73] Assignee: BASF Aktiengesellschaft, Ludwigshafen, Germany

[21] Appl. No.: 714,490

[22] Filed: Sep. 18, 1996

Related U.S. Application Data

[60] Continuation of Ser. No. 431,793, May 1, 1995, abandoned, which is a division of Ser. No. 303,718, Sep. 9, 1994, abandoned.

[30] Foreign Application Priority Data

Sep. 18, 1993 [DE] Germany ............... 43 31 805.3

[51] Int. Cl.$^6$ ................ C08L 25/12; C08L 35/06
[52] U.S. Cl. ............. 525/203; 525/204; 525/208; 525/217; 525/221
[58] Field of Search ................ 525/203, 204, 525/208, 217, 221

[56] References Cited

U.S. PATENT DOCUMENTS

| | | |
|---|---|---|
| 3,582,512 | 6/1971 | Fantl . |
| 3,793,402 | 2/1974 | Owens ............... 525/932 |
| 4,290,932 | 9/1981 | Wright ............... 525/221 |
| 4,427,820 | 1/1984 | Backhouse ............... 524/504 |
| 4,554,316 | 11/1985 | Sakano et al. ............... 525/71 |
| 4,560,726 | 12/1985 | Eichenauer et al. ............... 525/71 |
| 4,612,347 | 9/1986 | Eichenauer et al. ............... 525/73 |
| 4,668,737 | 5/1987 | Eichenauer et al. ............... 525/73 |
| 4,758,492 | 7/1988 | Nair ............... 526/318.43 |
| 4,803,252 | 2/1989 | Kida et al. ............... 526/297 |
| 5,342,898 | 8/1994 | Seitz ............... 525/78 |
| 5,346,954 | 9/1994 | Wu ............... 525/932 |

FOREIGN PATENT DOCUMENTS

| | | |
|---|---|---|
| 312 001 | 6/1984 | European Pat. Off. . |
| 139 271 | 10/1984 | European Pat. Off. . |
| 33 40 591 | 5/1984 | Germany . |
| 34 21 353 | 6/1984 | Germany . |
| 34 05 938 | 8/1985 | Germany . |
| 337301 | 11/1992 | Japan ............... 526/318.43 |

OTHER PUBLICATIONS

*Derwent Publ. Ltd.*, AN 91-032005 (English abstract of JP-A 2 300 203, Dec. 12, 1990).
*Derwent Publ. Ltd.*, AN 90-064216 (English abstract of JP-A 2 018 465, Jan. 22, 1990).
*Derwent Publ. Ltd.*, AN 84-254303 (English abstract of JP-A 59 154 988).
*Derwent Publ. Ltd.*, AN 86-066518 (English abstract of JP-A 61 019 614).
*Derwent Publ. Ltd.*, AN 90-243604 (English abstract of JP-A 2 170 806, Jul. 2, 1990).
*Derwent Publ. Ltd.*, AN 93-251868 (English abstract of JP-A 5 070 513, Mar. 23, 1993).

*Primary Examiner*—David Buttner
*Attorney, Agent, or Firm*—Keil & Weinkauf

[57] ABSTRACT

A particulate polymer A having a mean particle size of less than 1000 nm consists of a1: up to 99.8% by weight of at least one vinylaromatic monomer a1,
a2: up to 99.8% by weight of at least one alkyl methacrylate a2 where the alkyl radical is of 1 to 8 carbon atoms,
a3: up to 50% by weight of at least one polar, copolymerizable, ethylenically unsaturated monomer a3,
a4: from 0.1 to 10% by weight of at least one polyfunctional, crosslinking monomer a4 and
a5: from 0.1 to 15, preferably from 0.5 to 10, % by weight of at least one monomer a5 containing one or more acidic, basic or epoxy groups, the sum of the components a1, a2 and a3 being from 75 to 99.8% by weight, based on A, and the sum of a1, a2, a3, a4 and a5 being 100% by weight, based on A.

3 Claims, No Drawings

DULL, TRANSPARENT THERMOPLASTIC RESINS

This application is a continuation of application Ser. No. 08/431,793, filed on May 1, 1995, which is a division of Ser. No. 08/303,718 filed Sep. 9, 1994, both now abandoned.

The present invention relates to dull and transparent cross-linked thermoplastic resins and to their use as dulling agents.

There are many possibilities for preparing thermoplastic molding materials having dull surfaces. This is done by mixing graft rubbers (possibly modified with acids, bases or epoxides) with thermoplastic resins (possibly modified with acids, bases or epoxides).

The relevant publications are the following:
EP 450 511
DE 34 21 353
EP 139 271
DE 34 05 938
EP 312 001
DE 33 40 591

EP 450 511, DE 34 21 353 and EP 139 271 describe thermoplastic molding materials having dull surfaces, in which graft rubbers which contain acids and may contain bases are used. It is also possible to mix graft rubbers having acidic functions with thermoplastic resins having basic functions (DE 34 05 938). EP 312 001 describes a mixture of a toughened thermoplastic resin, an epoxy-containing copolymer and a polymer having hydroxyl, N-basic or anhydride groups. According to DE 33 40 591, a thermoplastic resin material contains an olefin polymer modified with epoxy groups or with an unsaturated carboxylic acid.

It is also possible to obtain dull thermoplastic molding materials by using graft rubbers having very large particle diameters. However, dull thermoplastic moldings having high transparency cannot be obtained by the known possible methods.

We have found that, by adding certain crosslinked particles to thermoplastic resins, transparent and dull molding materials are obtained without having to accept a substantial deterioration in the mechanical properties of the thermoplastic resin.

The present invention relates directly to a particulate polymer A, prepared by emulsion polymerization, having a mean particle size of less than 1000 nm, preferably less than 750 nm and particularly preferably less than 500 nm, and consisting of a1: up to 99.8, preferably up to 99, % by weight of at least one vinylaromatic monomer a1, a2: up to 99.8, preferably up to 99, % by weight of at least one alkyl methacrylate a2 where the alkyl radical is of 1 to 8 carbon atoms, a3: up to 50, preferably up to 40, % by weight of at least one polar, copolymerizable, ethylenically unsaturated monomer a3, a4: from 0.1 to 10, preferably from 0.5 to 5, % by weight of at least one polyfunctional, crosslinking monomer a4 and a5: from 0.1 to 15, preferably from 0.5 to 10, % by weight of at least one monomer a5 containing one or more acidic, basic or epoxy groups, the sum of the components a1, a2 and a3 being from 75 to 99.8, preferably from 85 to 99, % by weight and the sum of a1, a2, a3, a4 and a5 being 100% by weight, based on A.

The present invention also relates to thermoplastic molding materials essentially comprising from 1 to 50, preferably from 5 to 40, % by weight of the particulate polymer A and from 5 to 99, preferably from 60 to 95, % by weight of at least one polymer having a glass transition temperature of more than 25° C., the difference between the refractive index of polymer A and that of the polymer having a glass transition temperature of more than 25° C. being less than 0.2, preferably less than 0.02, and, if required, minor amounts of conventional additives and assistants.

The present invention therefore relates to particulate polymers of the above composition relating to the preparation, and to thermoplastic molding materials prepared using such polymers.

The following may be stated specifically about the novel particulate polymers, their components and their preparation: the particulate polymers are obtained in a conventional manner by emulsion polymerization. Examples of vinylaromatic monomers a1 are styrene, α-methylstyrene and styrene alkylated in the nucleus, such as p-methylstyrene and tert-butylstyrene. Styrene, α-methylstyrene and p-methylstyrene are preferably used. Examples of polar, copolymerizable, ethylenically unsaturated monomers a3 are acrylonitrile, methacrylonitrile and $C_1$- and $C_{12}$-esters of acrylic acid. Suitable crosslinking agents are monomers which contain at least two ethylenic double bonds which are capable of copolymerization and are not conjugated in the 1,3 position.

Examples are divinylbenzene, diallyl maleate, diallyl fumarate, diallyl phthalate, allyl methacrylate, triallyl cyanurate, triallyl isocyanurate, acrylates of tricyclodecenyl alcohol or (meth) acrylates of diols of up to 8 carbon atoms. Suitable monomers a5 containing acidic groups are monomers having carboxyl or sulfo groups. Preferred monomers are α,β-unsaturated carboxylic acids, such as acrylic acid or methacrylic acid, as well as citraconic acid, crotonic acid, fumaric acid, itaconic acid, maleic acid, vinylsulfonic acid, vinylbenzenesulfonic acid, vinylphosphoric acid and cinnamic acid. Suitable monomers containing basic groups are monomers having tertiary amino groups. Examples are dimethylaminoethyl (meth)acrylate, morpholine methacrylate, N-vinylimidazole, p-dimethylaminostyrene, N-vinylcarbazole, N-vinylindole, N-vinylpyrrole, 4-vinylpyrimidine, 2-vinylpyridine, 3-vinylpyridine, 4-vinylpyridine and mixtures thereof. Particularly preferred monomers are esters of acrylic acid or methacrylic acid with aliphatic alcohols which contain a tertiary amino group in the alkyl radical.

The crosslinking agents a4 ensure that the particles obtained are retained as separate particles during mixing with the thermoplastic to be dulled. Probably owing to incompatibility with the thermoplastic to be dulled, the monomers a5 containing acidic or basic groups or epoxy groups lead to the formation of agglomerates, which result in surface roughness and hence a dull effect.

The novel particulate polymers may also be used alone as molding materials. For this purpose, they may be worked up, for example, by spray drying. However, the particulate polymers are preferably used for mixing with a thermoplastic to be dulled. Thermoplastics suitable for modification have glass transition temperatures above 25° C., preferably above 60° C., the difference between the refractive index of the particulate polymer and that of the polymer having a glass transition temperature of more than 25° C. being less than 0.2, preferably 0.02. Examples of suitable thermoplastics are polyvinyl chloride, polymethyl methacrylate, polystyrene and copolymers of a vinylaromatic monomer and a polar, copolymerizable, ethylenically unsaturated monomer. Preferred copolymers are styrene/acrylonitrile and α-methylstyrene/acrylonitrile copolymers. The novel particulate polymers may be incorporated by extruding, kneading or roll-milling components together.

The novel thermoplastic molding materials may contain, as further components, additives such as those usually used for thermoplastic molding materials. Examples of these are fillers, further compatible plastics, antistatic agents, antioxidants, flameproofing agents, lubricants, dyes and pigments. The additives are used in conventional amounts, preferably in amounts of up to 30% by weight, based on the total weight of the thermoplastic molding material. Compatible plastics may also account for a higher proportion.

EXAMPLES

1. Preparation of the Particulate Polymer 160 g of the monomer mixtures stated in Table 1 in 1500 g of water were heated to 65° C. while stirring, with the addition of 5 g of the sodium salt of a $C_{12}$–$C_{18}$-paraffinsulfonic acid, 3 g of potassium peroxodisulfate, 3 g of sodium bicarbonate and 1.5 g of sodium pyrophosphate. 10 minutes after initiation of the polymerization reaction, a further 840 g of the mixture stated in Table 1 were added in the course of 3 hours. After the end of the monomer addition, the emulsion was kept at 65° C. for a further hour. The dispersion obtained was precipitated by means of magnesium sulfate solution, and the polymer isolated was washed with distilled water and dried.

2. Mixing with Rigid Component

For the preparation of the blends, a styrene/acrylonitrile copolymer having an acrylonitrile content of 19% and a viscosity number of 100 ml/g was used. The precipitated and dried polymer from (1) was mixed with the styrene/acrylonitrile copolymer in an extruder at 260° C. so that the resulting content of the polymer according to (1) was 10%, based on the dulled molding material. Moldings were produced from this blend by injection molding.

The mechanical properties of the blends and the gloss of the moldings produced therefrom are summarized in Table 2.

Tests

Mechanical properties:
Impact strength $a_n$ according to DIN 53,253-n, measured at room temperature
Modulus of elasticity according to DIN 53,457-3
Optical properties:
Transparency according to DIN 5036 (measured using circular discs, 80 mm×6 mm)

TABLE 1

| | Composition of the monomer mixtures | | | |
|---|---|---|---|---|
| No. | Styrene | Acrylonitrile | Crosslinking agent | Methacrylic acid |
| 1 | 73 parts | 23.5 parts | 2 parts DCPA | 1.5 parts |
| 2 | 73 parts | 23.5 parts | 2 parts DVB | 1.5 parts |

DCPA = Acrylate of tricyclodecenyl alcohol
DVB = Divinylbenzene

TABLE 2

Optical and mechanical properties of the dulled moldings

| No. | Impact strength [kJ/m$^2$] | Modulus of elasticity [Nmm$^2$] | Gloss | Transparency [%] |
|---|---|---|---|---|
| 1 | 14 | 3600 | dull | 87 |
| 2 | 12 | 3700 | dull | 87 |
| V1) | 15 | 3600 | glossy | 88 |
| V2) | 16 | 3200 | dull | 0 |

V1) Comparative experiment without polymer according to claim (1)
V2) Comparative experiment using dulling agent according to EP 450 511

We claim:

1. A transparent and dull molding consisting, essentially of a composition comprising from 1 to 50% by weight of a particulate crosslinked polymer A having a mean particle size of less than 1000 Dan and consisting of a1: up to 99.8% by weight of at least one vinylaromatic monomer a1, a2: up to 99.8% by weight of at least one alkyl methacrylate a2 where the alkyl radical is of 1 to 8 carbon atoms, a3: up to 50% by weight of acrylonitrile, methacrylonitrile, or mixtures there of a3, a4: from 0.1 to 10% by weight of at least one polyfunctional crosslinking monomer a4 and a5: from 0.1 to 15% by weight of at least one monomer a5 containing one or more acidic, basic or epoxy groups the sum of the components a1, a2 and a3 being from 75 to 99.8% by weight, based on A, and the sum of a1, a2, a3, a4 and a5 being 100% by weight, based on A and from 50 to 99% by weight of at least one polymer having a glass transition temperature of more than 25° C., the difference between the refractive index of the polymer A and that of the polymer having a glass transition temperature of more than 25° C. being less than 0.2, and optionally, minor amounts of conventional additives and assistants, there being no substantial deterioration in the mechanical properties of the polymer having a glass transition temperature of more than 25° C.

2. The transparent and dull molding of claim 1, wherein the amount of polymer A is from 5 to 40% by weight, and the amount of the polymer having a glass transition temperature of more than 25° C. is from 60 to 95% by weight.

3. The transparent and dull molding of claim 2, wherein the difference between the refractive index of polymer A and that of the polymer having a glass transition temperature of more than 25° C. is less than 0.02.

* * * * *

UNITED STATES PATENT AND TRADEMARK OFFICE
CERTIFICATE OF CORRECTION

PATENT NO.: 5,717,033

DATED: February 10, 1998

INVENTOR(S): FISCHER et al.

It is certified that error appears in the above-identified patent and that said Letters Patent is hereby corrected as shown below:

Column 4, claim 1, line 16, after "consisting" delete the comma --,--.

Column 4, claim 1, line 19, "Dan" should be --nm--.

Signed and Sealed this

Second Day of June, 1998

Attest:

BRUCE LEHMAN

Attesting Officer      Commissioner of Patents and Trademarks